United States Patent [19]
Mashino et al.

[11] Patent Number: 5,561,363
[45] Date of Patent: Oct. 1, 1996

[54] GENERATION CONTROLLER FOR A VEHICLE

[75] Inventors: Keiichi Mashino; Yuji Maeda, both of Hitachiota; Nobuo Takamoto, Higashimurayama, all of Japan

[73] Assignee: Hitachi, Ltd., Tokyo, Japan

[21] Appl. No.: 423,375

[22] Filed: Apr. 18, 1995

[30] Foreign Application Priority Data

Apr. 22, 1994 [JP] Japan .................................. 6-084322

[51] Int. Cl.⁶ .................................................... H02P 9/00
[52] U.S. Cl. ............................................. 322/25; 322/28
[58] Field of Search ................................. 322/22, 23, 24, 322/25, 27, 28

[56] References Cited

U.S. PATENT DOCUMENTS

| | | | |
|---|---|---|---|
| 4,419,618 | 12/1983 | Gretsch | 322/7 |
| 4,883,973 | 11/1989 | Lakey et al. | 290/31 |
| 5,160,881 | 11/1992 | Schramm et al. | 322/7 |
| 5,298,851 | 3/1994 | DeNardis | 322/28 |
| 5,323,102 | 6/1994 | Torii et al. | 322/90 |

Primary Examiner—Thomas M. Dougherty
Assistant Examiner—Nicholas Ponomarenko
Attorney, Agent, or Firm—Antonelli, Terry, Stout & Kraus

[57] ABSTRACT

A state of a plurality of switches for performing application and cutoff of a plurality of electrical loads is stored in a memory circuit. A pattern of supply power after application of the load for each of the plurality of electrical loads and a load response priority order assigned previously to each of the electrical loads are stored in a memory table. A control circuit identifies a newly applied load on the basis of the turned-on state of the plurality of switches stored in the memory circuit and instructs an electric power supply circuit to supply electric power in accordance with the supply power pattern corresponding to the identified load, while the control circuit prohibits application of the newly applied electrical load when an electrical load having the load response priority order higher than that of the newly applied electrical load has been already applied. The memory table may store consumption power and an application priority order assigned previously to each of the electrical loads. In this case, a total amount of consumption power of the applied electrical loads is calculated. When an electrical load having the application priority order lower than that of the newly applied electrical load has been already applied and the control circuit judges that the total amount of consumption power of the applied electrical loads exceeds a predetermined value, the control circuit instructs to cut off the electrical load having the lower application priority order.

23 Claims, 9 Drawing Sheets

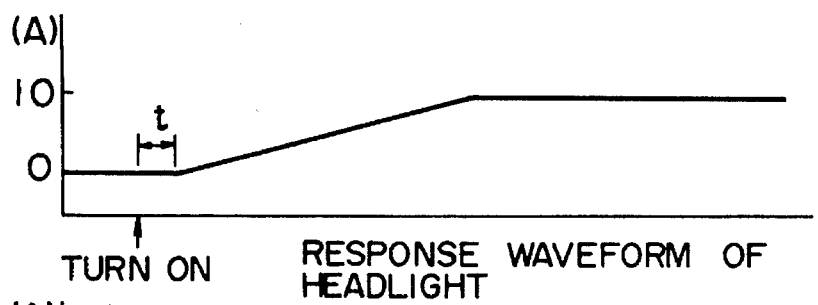
FIG. 7A  RESPONSE WAVEFORM OF HEADLIGHT
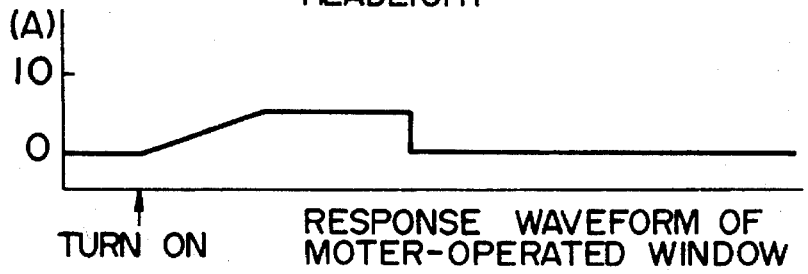
FIG. 7B  RESPONSE WAVEFORM OF MOTER-OPERATED WINDOW
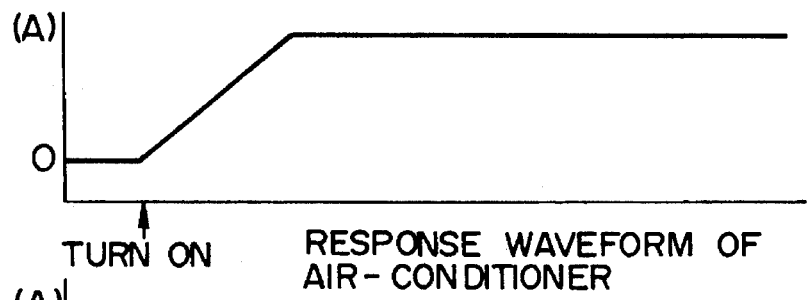
FIG. 7C  RESPONSE WAVEFORM OF AIR-CONDITIONER
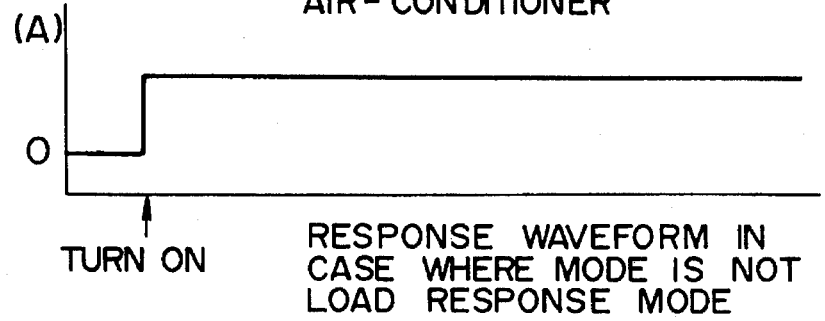
FIG. 7D  RESPONSE WAVEFORM IN CASE WHERE MODE IS NOT LOAD RESPONSE MODE
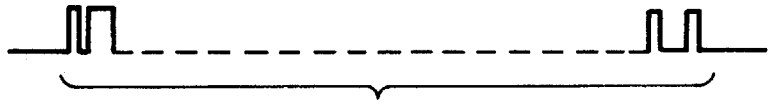
FIG. 8A
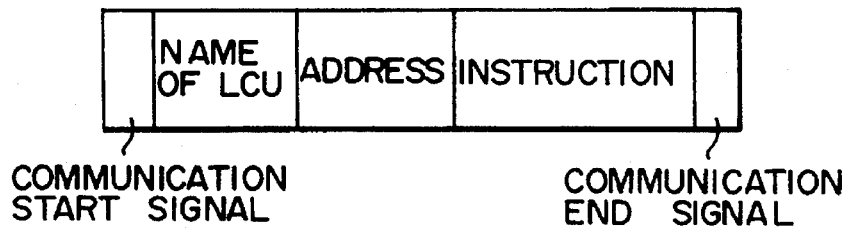
FIG. 8B

GENERATION CONTROLLER FOR A VEHICLE

BACKGROUND OF THE INVENTION

The present invention relates to a generation controller for a vehicle and more particularly to a generation controller for a vehicle suitable for a concentrated wiring system of a charging generator or dynamo for a vehicle.

With respect to a generator for a vehicle, there is known a technique as described in JP-A-60-16195 in which states of an internal Combustion engine and electrical loads are detected to control an output of the generator in response to the states.

On the other hand, U.S. Pat. No. 4,459,489 discloses a technique that a rising rate of consumption torque of a generator upon application of an electrical load is suppressed to thereby prevent reduction of an idle rotational speed of an internal combustion engine.

Further, a trial that electrical wiring of a vehicle is concentrated by means of the serial transmission technique is described in, for example, JP-B-3-15866 (corresponding to JP-A-59-167151).

In JP-A-60-16195, however, since application states of a plurality of electrical loads are observed to grasp a target generation voltage, it is necessary to draw a large number of electrical wiring conductors into a controller, so that wiring is complicated.

In U.S. Pat. No. 4,459,489, since application of electrical loads is detected on the basis of rapid reduction of a battery voltage, the application of the electrical loads can be detected by means of only the generator. Accordingly, there is a merit that it is not necessary to draw many electrical wiring conductors, whereas since load response control is started after the electrical loads are applied, the rotational speed of an internal combustion engine is not avoided from being reduced to some degree until the load response control is started.

In addition, since an increasing pattern of a current is different depending on kinds of electrical loads, an increasing rate of electrical loads, that is, an increasing rate of consumption torque of the generator and an increasing rate of a fuel supply rate to an internal combustion engine are not necessarily coincident with each other and it is unavoidable that a degree of reduction of the rotational speed of the internal combustion engine is different depending on kinds of electrical loads.

Furthermore, any of the above-mentioned techniques merely controls energization to the electrical loads and does not consider that it is judged which electrical load is controlled in what manner by the generator as an electric power supply source.

Further, a battery charging generator of a vehicle is normally operated by means of an internal combustion engine for driving the vehicle and there is a problem that when an output generated by the generator is changed due to any cause, its driving torque is also varied to thereby produce a variation in the rotational speed of the internal combustion engine. With regard to this problem, the above-mentioned U.S. Pat. No. 4,459,489 discloses that a variation in an output voltage of the generator is detected and rising of an output of the generator is intentionally delayed to suppress rapid rising of a driving torque.

In this method, however, since the rising is delayed after the torque has been varied due to application of the electrical loads, it is unavoidable to reduce the rotational speed of the engine to some degree. Further, there is an practical problem that, for example, when a headlight is lighted at night and a heavy electrical load such as a heater is then turned on, a voltage of a battery is dropped temporarily (about 1 to 10 seconds) since the load response operation is slow and the headlight becomes dark during the drop of the battery voltage, so that the driver feels apprehensions.

SUMMARY OF THE INVENTION

It is an object of the present invention to provide a generation controller for a vehicle capable of eliminating reduction of the rotational speed of an internal combustion engine caused by application of electrical loads while rapidly controlling a generated output against increase-and reduction of the electrical loads.

It is another object of the present invention to provide a generation controller for a vehicle capable of preventing reduction of the intensity of illumination of a lamp in response to application of electrical loads.

It is still another object of the present invention to provide a generation controller for a vehicle capable of preventing overdischarge of a battery to improve the reliability of the vehicle.

In order to achieve the first described two features of the present invention, in a concentrated wiring system in a vehicle including a generator, a battery charged by the generator, a plurality of local processing units for supplying electric power from the battery to a plurality of electrical loads, a central control unit for performing data transmission between the central control unit and the local processing units, switches connected to the local processing units, and a voltage regulator for adjusting a generated voltage of the generator, the present invention comprises memory means for storing an amount of electric power of electrical loads generated by turning on of the switches, a receiving circuit for receiving data of a turned-on state of the switches transmitted from the central control unit, and a control circuit for increasing an amount of electric power corresponding to a turned-on switch with a predetermined waveform for the switch when the turning on of the switch is detected by means of the receiving circuit, whereby control is performed in accordance with kinds of the loads and when a switch corresponding to a first electrical load is turned on and a second electrical load having a load response priority order higher than that of the first electrical load has been already applied, it is canceled that electric power to the first electric load is increased with the predetermined waveform.

Further, the feature described last of the present invention is achieved by calculating a total amount of applied electrical load and controlling application and release or cutoff of an electrical load in consideration of a difference between the total amount and an output capacity of the generator.

The memory means for storing the amount of electric power previously stores an amount of electric power generated in response to turning on of the switches and grasps an amount of electric power required by a driver.

When the receiving circuit receives the data of the turned-on state of the switches transmitted from the central control unit, the receiving circuit judges which switch is turned on or which electrical load is applied.

The control circuit detects turning on of the switches by means of the receiving circuit and increases an amount of electric power corresponding to the turned-on switches with the predetermined waveform to thereby produce a control signal so as to increase consumption torque of the generator gradually.

With the above operation, transient torque of the generator is controlled in accordance with a kind of the turned-on load and the correlation with an amount of supply fuel in the idle control of the internal combustion engine is optimized to thereby eliminate reduction of the rotational speed of the internal combustion engine.

Furthermore, when the headlight, for example, is turned on, it is prohibited that the generated output of the generator is increased with the predetermined waveform for the applied load to thereby shorten the response speed for the generation control and suppress variation of the illumination intensity of the headlight.

BRIEF DESCRIPTION OF THE DRAWINGS

FIGS. 7A, 7B, 7C and 7D are waveform diagrams of currents flowing in accordance with kinds of loads and taking the response priority order into consideration;

FIGS. 8A and 8B show a protocol of a communication signal transmitted in the system shown in FIG. 1;

DESCRIPTION OF THE PREFERRED EMBODIMENTS

Figure 1:
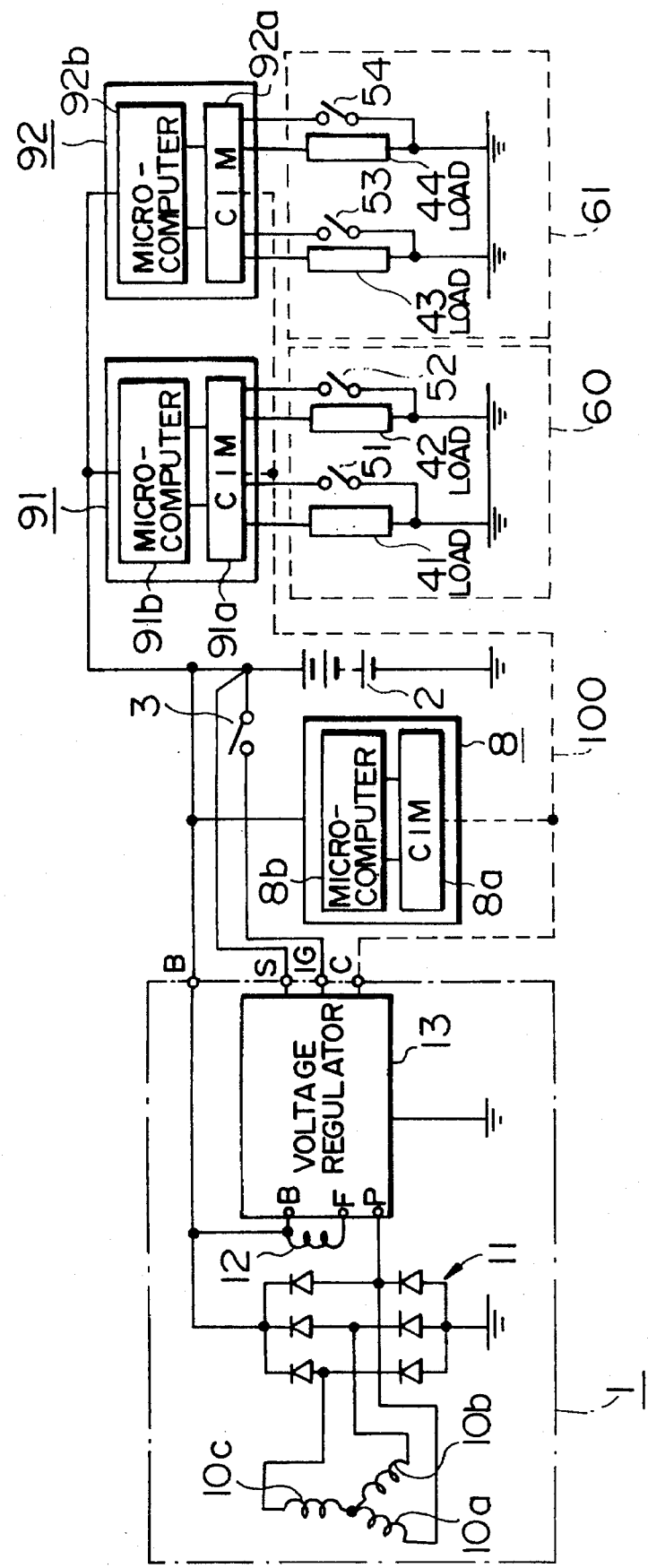
FIG. 1 is a circuit diagram schematically illustrating a charging generator system for an automobile according to an embodiment of the present invention.

An embodiment of the present invention is now described with reference to FIG. 1. FIG. 1 is a circuit diagram illustrating a charging generator for an automobile. In FIG. 1, reference numeral 1 denotes a generator which is mechanically coupled with an output shaft (not shown) of an internal combustion engine to be driven by rotation thereof. The generator 1 includes three-phase armature windings 10*a*, 10*b* and 10*c* which are Y-connected to each other, a three-phase full-wave rectifier 11 for converting AC output voltages of the armature windings into a DC voltage, a field winding 12, and a voltage regulator 13 for adjusting a generated output in accordance with an output of a battery 2 or the generator.

Reference numeral 3 denotes a key switch. Connected to the battery 2 are a central processing or control unit 8 of a concentrated wiring system in the automobile, electrical loads 41, 42, 43 and 44 such as lamps and motors and load switches 51, 52, 53 and 54 through local processing or control units 91 and 92.

The electrical load control switches 51 to 54 are operated by the driver. The load switches 51 to 54 corresponding to the electrical loads 41 to 44 do not necessarily have the paired relation. The load switches 51 to 54 are normally disposed in the nearest positions to the central processing unit 8 or the local processing units 91 and 92. The central processing unit 8 and the local processing units 91 and 92 include a communication processing or interface module CIM 8*a*, 91*a* and 92*a* and microcomputers 8*b*, 91*b* and 92*b*, respectively.

The central processing unit 8, the local processing units 91 and 92 and an external control signal terminal (C terminal) of the generator 1 are connected to each other through an optical fiber cable 100.

Figure 2:
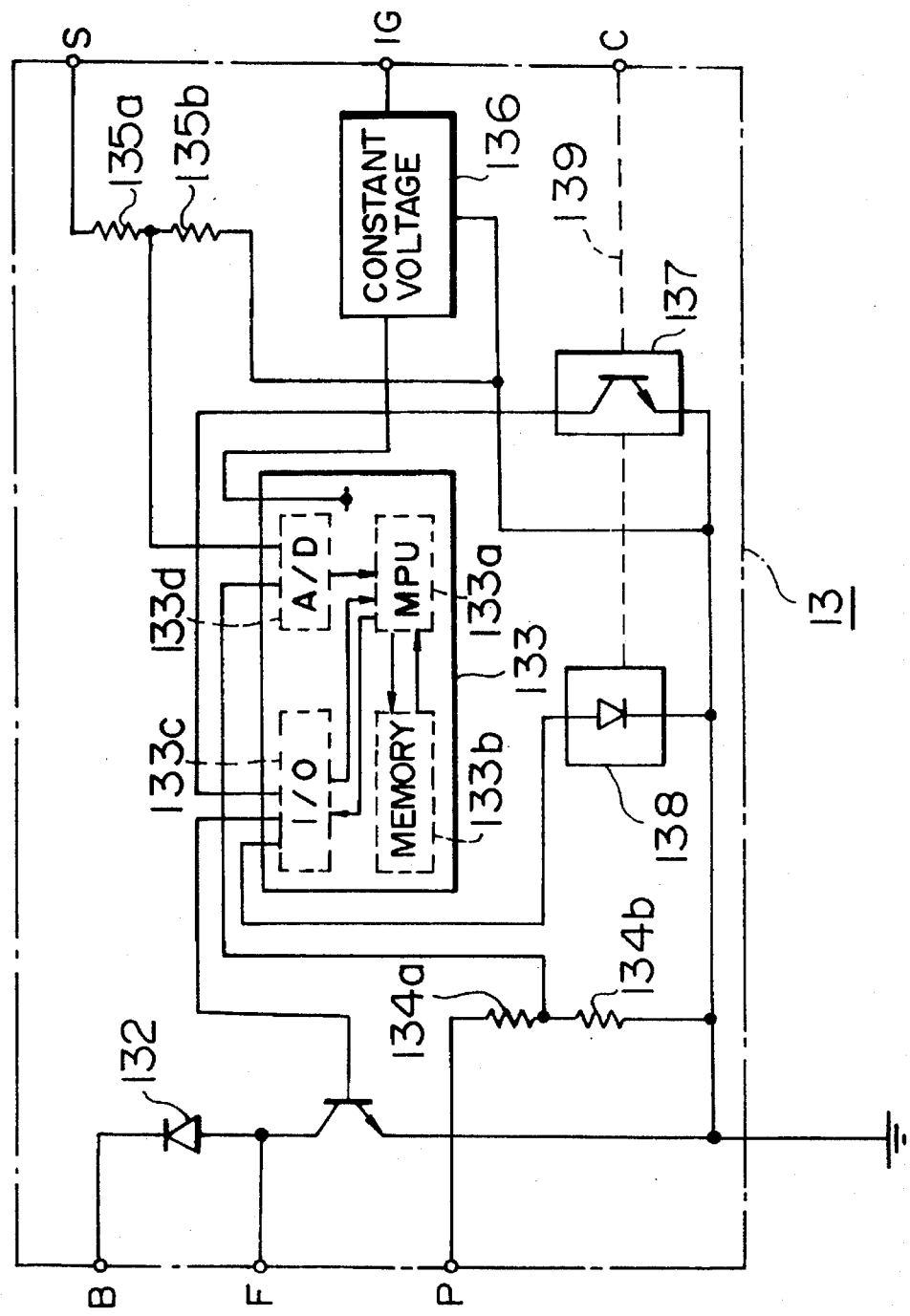
FIG. 2 is an internal circuit diagram schematically illustrating a voltage regulator in the system shown in FIG. 1.

The voltage regulator 13 includes, as shown in detail in FIG. 2, a power transistor 131, a flywheel diode 132, a control circuit 133, voltage dividing resistors 134*a*, 134*b*, 135*a* and 135*b*, a constant voltage circuit 136 and a phototransistor 137. The control circuit 133 is constituted by a microcomputer and includes an MPU 133*a*, a memory 133b composed of a RAM and a ROM, an I/O (input/output) port 133*c* and an A/D converter 133*d*.

Reference numeral 138 denotes a light emitting diode. The light emitting diode 138 and the phototransistor 137 are both connected to an optical connector "C" through an optical fiber 139.

With the above configuration, when the key switch 3 is first turned on, a voltage is applied to an ignition terminal (IG terminal) of the generator 1 from the battery 2, so that the constant voltage circuit 136 of FIG. 2 supplies a fixed voltage to the control circuit 133. Thus, the control circuit 133 starts its operation.

Figure 3:
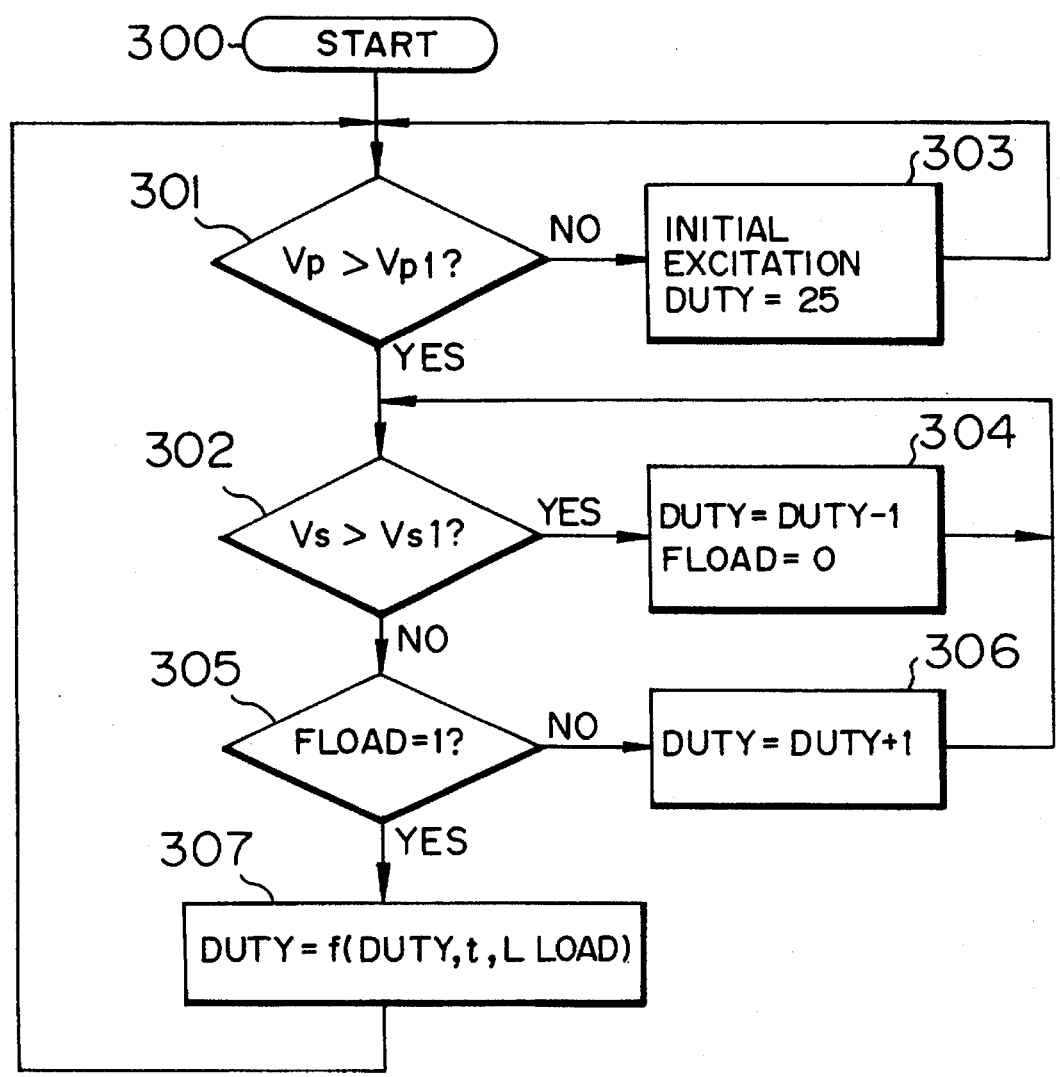
FIG. 3 is a flow chart showing operation of a control circuit in FIG. 2.

Referring now to the flow chart of FIG. 3, operation of the control circuit 133 is described. First of all, at step 301, a voltage at terminal P which is an output terminal of one phase of the armature winding is taken into the A/D converter and it is judged whether the voltage at the P terminal is lower than the fixed voltage (Vp1=3V) or not. When the voltage at the P terminal is lower than the fixed voltage, it is recognized that the generator is stopped and the "initial excitation" is performed at step 303. At this time, 25 is substituted for a variable "Duty" at step 303 to thereby apply an on-and-off signal having a frequency of 100 Hz and a duty ratio of 25% through the I/O port 133*c* to the power transistor 131, so that a fixed excitation current is supplied to the field winding 12.

When the internal combustion engine begins to be rotated by a starting device (not shown), an AC voltage is supplied to the P terminal of the voltage controller 13 of FIG. 2. When the voltage (Vp>Vp1) is detected by the A/D converter of the control circuit 133, the process escapes from the "initial excitation" mode and proceeds to step 302. At this time, it is judged whether a voltage of the battery 2 supplied through S terminal is higher than a predetermined voltage (which is Vs1=14.4 V and is set to be slightly higher than the battery voltage) or not. When the voltage Vs of the battery 2 is higher than the voltage Vs1, 1 is subtracted from the variable "Duty" so that the duty ratio "Duty" of the signal supplied to the power transistor 131 through the I/O port 133*c* is controlled to be made small at step 304. When the duty ratio of the signal supplied to the power transistor 131 is made small, the current flowing through the field winding 12 is reduced to thereby decrease an output voltage (at B terminal) of the generator so that generation of electric power is weakened.

A flag "Fload" indicating whether the mode is a load response mode (described later) or not is set to 0. When the voltage Vs of the battery 2 is lower than the voltage Vs1, the flag "Fload" is examined at step 305 and when the flag "Fload" is 0, that is, when the mode is not the load response mode, the process proceeds to step 306 in which the duty ratio "Duty" of the signal supplied to the power transistor 131 through the I/O port 133c is controlled to be increased. When the duty ratio of the signal supplied to the power transistor 131 is increased, the current flowing through the field winding 12 is enlarged to thereby increase the output voltage (at B terminal) of the generator so that generation of electric power is strengthened.

The negative feedback is effected by the above control so that the voltage Vs of the battery 2 is adjusted to be equal to the predetermined voltage Vs1. In this case, when the mode is the load response mode (that is, "Fload" =1), the process proceeds to step 307 in which the load response control is performed in accordance with a predetermined pattern for the past duty ratio "Duty", an elapsed time t(the application time of the load is set to t=0) and information "Lload" (described later) relative to a kind of load. This is performed to prevent a torque produced by the generator upon application of a heavy electrical load from being increased rapidly. The control circuit 133 repeats the operation shown in FIG. 3 while an interrupt described later is not produced. A response waveform thus obtained is as shown in FIG. 7D.

Operation upon application of the electrical load switch is now described. When the switch 51 is assumed to constitute, for example, a switch corresponding to the rear window heater 43 for the rear-seat window of block 60 and is turned on, the local processing unit 91 for the front portion of the vehicle sends a serial signal to the optical fiber cable 100 and the local processing unit 92 for the rear portion of the vehicle receives the signal. The local processing unit 92 judges the kind of the electrical load on the basis of the protocol (shown in FIG. 8 by way of example) of the signal and drives the corresponding electrical load (rear window heater) 43 in block 61. At this time, the serial signal on the optical fiber cable 100 is supplied to the external terminal (C terminal) of the voltage regulator 13.

In FIG. 2, an optical signal is converted into electrical signal by means of the phototransistor 137. The control circuit 133 analyzes the serial signal and monitors which switch is turned on sequentially. Thus, when the switch 51 is turned on and signal is transmitted through the optical fiber cable 100, the control unit 133 constituted by the microcomputer performs the following interrupt process.

Figure 4:
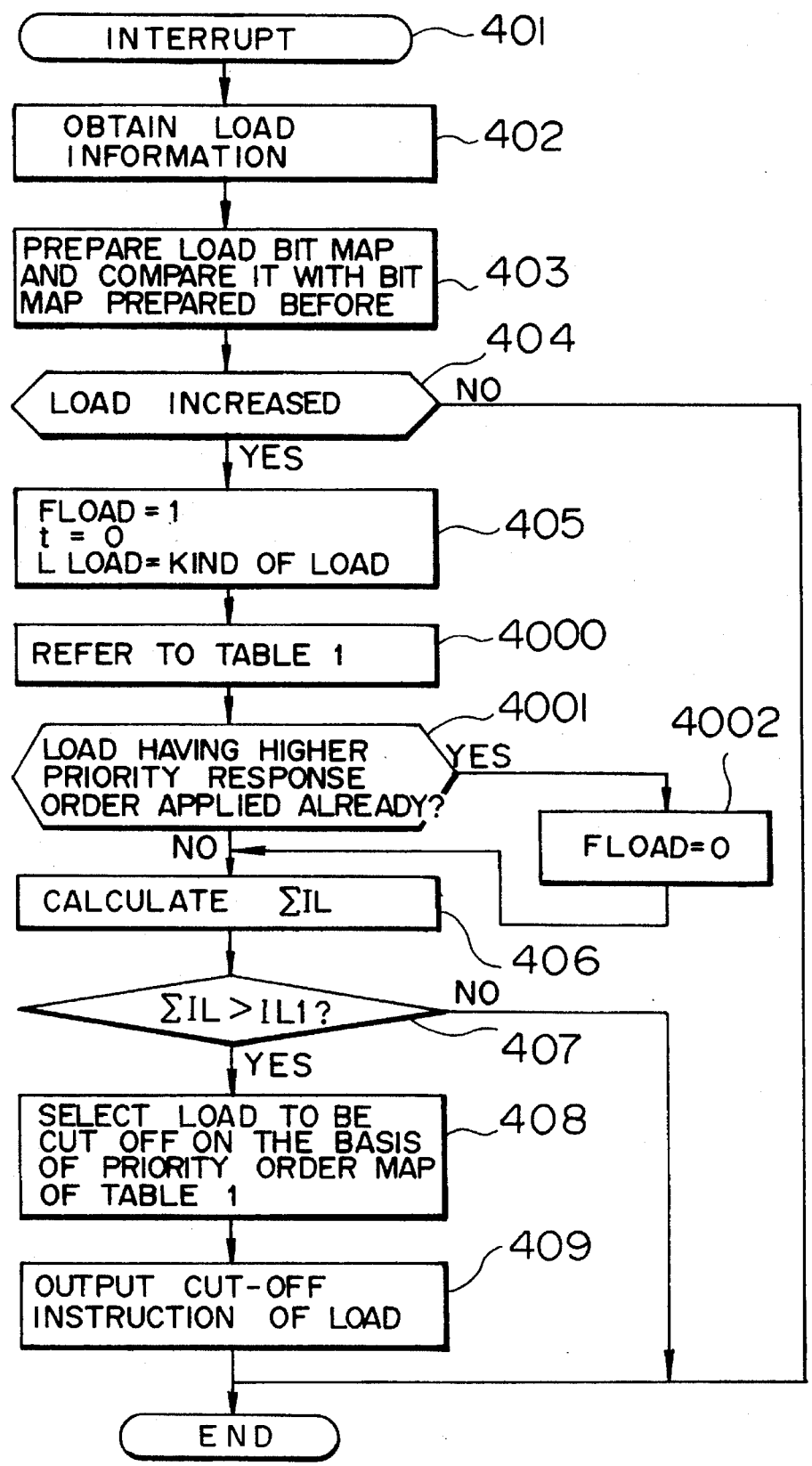
FIG. 4 is a flow chart showing an interrupt processing routine which is executed in response to a C terminal signal in FIG. 1.

FIG. 4 shows the interrupt processing routine operated in response to the signal at the external terminal (C terminal). First of all, at step 302, the control circuit 133 obtains information of the load in accordance with the communication signal protocol shown in FIGS. 8A and 8B. Thus, the control circuit 133 analyzes a kind of the load (defined in one-to-one relation from a name of the local unit for controlling the load and an address thereof) and an instruction indicating whether the load is applied or not.

Figure 5A:
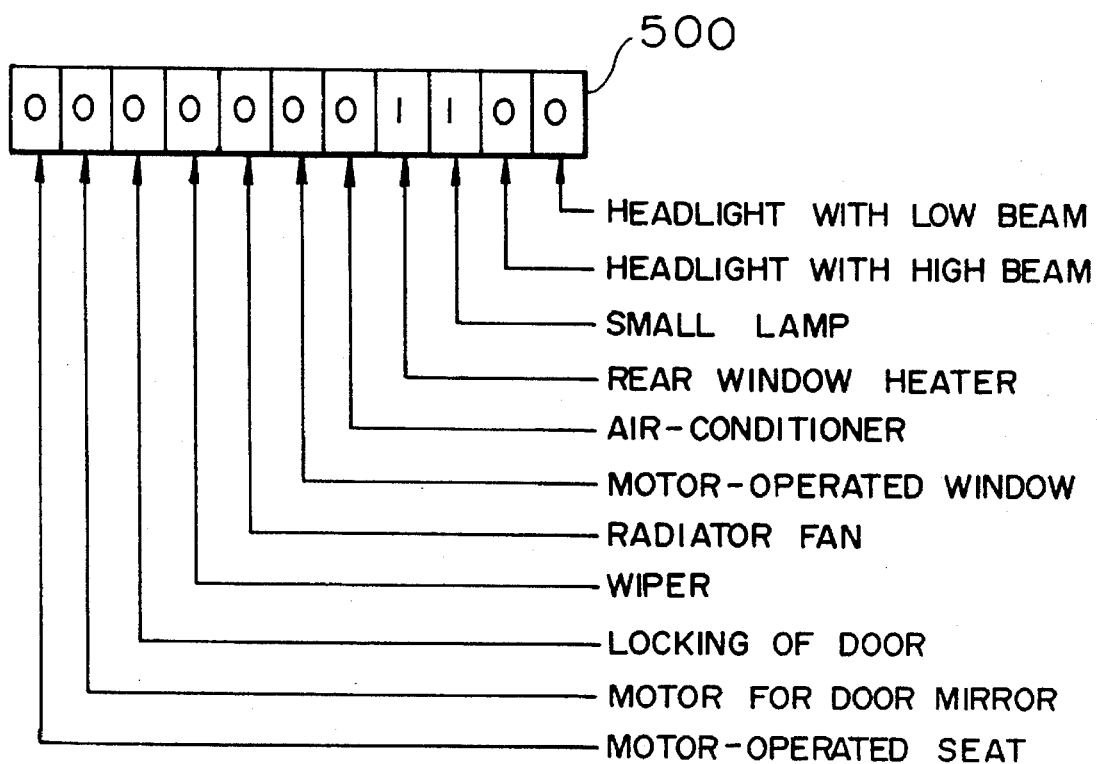
FIGS. 5A and 5B show examples of a load bit map stored in a memory 133*b* in FIG. 2.
Figure 5B:
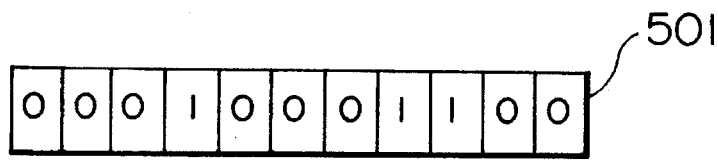

At step 403, a load bit map is prepared and the load bit map prepared before is referred to specify a load to be applied next. A response waveform corresponding to a current waveform of the load is read out from the memory 133b. The load bit map described above is a map having bits corresponding to electrical loads as shown in FIGS. 5A and 5B and representing which loads are currently applied or used on the basis of the bits. In the map, "0" represents that the load is not used and "1" represents that the load is used.

FIG. 5A shows the load bit map 500 prepared before and FIG. 5B shows the load bit map 501 prepared this time. Both of the load bit maps 500 and 501 can be compared with each other to specify the applied electrical load. That is, it is understood that the load bit maps 500 and 501 are compared with each other and the switch for the wiper is turned on this time. Detail information of the loads corresponding to the bit map is previously stored in the memory 133b in the manner as shown in TABLE 1. Stored in the memory are addresses of the loads (numbered from 1 successively), load priority order (described later), load response priority order and load current values.

TABLE 1

LOAD PRIORITY ORDER MAP

| Load Add. | Load Name | Load Priority Order | Load Response Priority Order | Current IL(A) |
|---|---|---|---|---|
| 1 | Headlight Low | 1 | 1 | 16 |
| 2 | Headlight High | 2 | 1 | 15 |
| 3 | Small Lamp | 1 | 2 | 6 |
| 4 | Rear Window Heating | 4 | 3 | 15 |
| 5 | Air-Conditioner | 3 | 3 | 14 |
| 6 | Motor-Op. Window | 1 | 2 | 8 |
| 7 | Radiator Fan | 2 | 3 | 10 |
| 8 | Wiper | 1 | 2 | 6 |
| 9 | Door Lock | 2 | 3 | 4 |
| 10 | Door Mirror Motor | 2 | 3 | 3 |
| 11 | Motor-Op. Seat | 3 | 3 | 20 |
| . | . | . | . | . |
| . | . | . | . | . |

Further, the memory 133b stores predetermined response waveforms in accordance with kinds of electrical loads. In order to explain these response waveforms, the fact that current waveforms upon application are different depending on the kinds of the loads is now described.

Figure 6A:
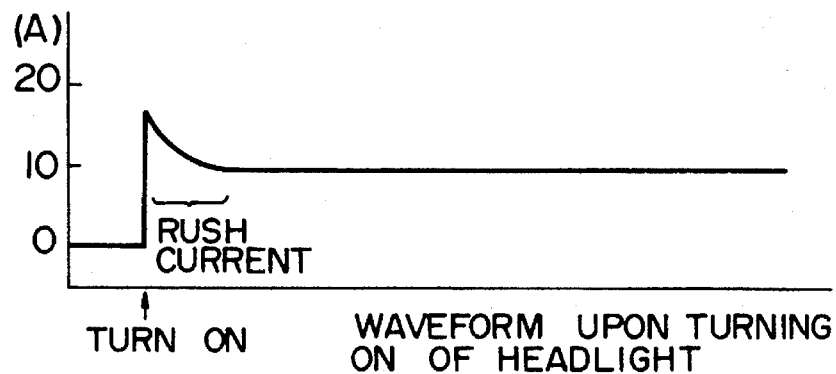
FIGS. 6A, 6B and 6C are waveform diagrams of currents flowing upon turning on of a switch and represented in accordance with kinds of loads.

FIG. 6A shows a waveform produced when the headlight is lighted. It is known that when a filament of an illumination apparatus is cooled, an electrical resistance value thereof is low and accordingly a rush current flows.

Figure 6B:
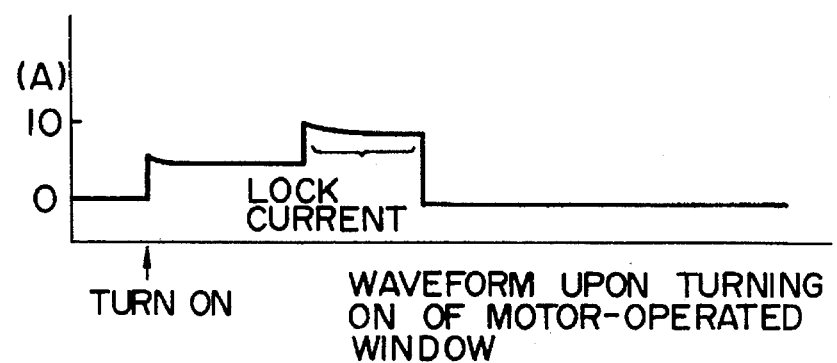

FIG. 6B shows a waveform produced when the motor-operated window is operated. The motor-operated window is featured in that when the window has been opened or closed completely a lock current flows.

Figure 6C:
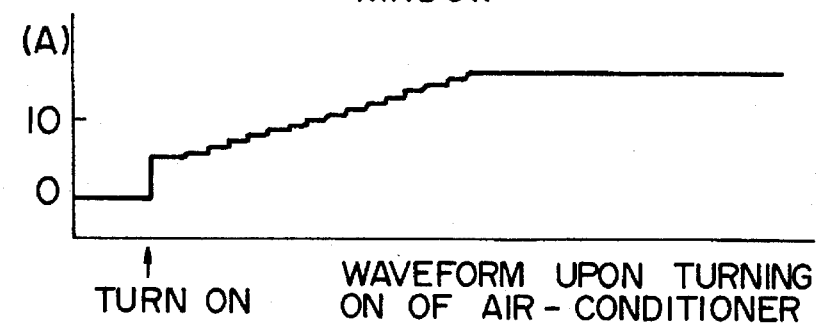

FIG. 6C shows a waveform produced when the automatic air-conditioner is operated. In this case, a magnet clutch of a compressor is immediately energized just after operation of the air-conditioner and energization to a blower motor is then controlled to increase a current stepwise by means of operation of a soft start circuit.

The memory 133b stores the response waveforms as shown in FIGS. 7A, 7B and 7C for the above loads.

FIG. 7A shows a response waveform for the headlight. In FIG. 7A, ($\tau$) is to maintain the output of the generator to zero during generation of the rush current to thereby prevent rapid increase of a generation torque.

FIG. 7B shows a response waveform for the motor-operated window for preventing the generated current from being increased just before occurrence of the lock current to thereby suppress excessive generation by the lock current.

FIG. 7C shows a response waveform for the automatic air-conditioner, which is stored in the memory 133b as having a rising or increasing speed with the correlation and the time constant of the soft start circuit described above.

FIG. 7D shows a response waveform in the case where the output control of the generator is performed without use of the predetermined response waveform and which is coincident with a response waveform in the case where the interrupt process shown in FIG. 3 is not produced as described above.

Referring again to FIG. 4, at step 404, whether the load is increased or decreased is examined. The presence of the load turned on newly as compared with the previous load (bit map of FIG. 5A) is judged in accordance with the bit map of FIG. 5B and when the load turned on newly is present, the process proceeds to step 405. At step 405, the load response mode flag "Fload" is set to 1. A time variable t is reset to zero to define the start time when the load is turned on.

Further, the information of the kind of the load (which may be the same as the load address of TABLE 1, for example) is set in the variable "Lload". At this time, the load response priority order table of TABLE 1 is referred (step 4000) and when the load having the higher priority order than the newly applied load has been already applied (step 4001), the flag "Fload" is reset (step 4002) to stop the load response operation in accordance with the predetermined pattern. For example, when the headlight with low beam or the headlight with high beam has been turned on, the load response operation is not performed even if any other load is turned on. This is a step for avoiding a problem on safety that illumination is darkened since the generation of electric power is suppressed temporarily when the load response control is performed during traveling at night.

When the load having the priority order higher than that of the newly applied load is not applied, the flag "Fload" is maintained to 1 as it is. The duty ratio "Duty" for enabling to produce a current waveform of FIGS. 7A–7C is calculated at step 307 of FIG. 3 of the main program on the basis of the flag "Fload". Further, the optimum duty ratio is calculated from the rotational speed and the field current versus output current characteristic of the generator.

Returning to FIG. 4, the process proceeds to step 406, in which the total amount ΣIL of the currently applied load containing the newly applied load is calculated on the basis of the bit map of FIG. 5B. At step 407, the total amount ΣIL is compared with the set value IL1 (allowable output current of generator or a current value slightly lower than it). When the total amount ΣIL is larger than the value IL1, it means that the generator has no sufficient generation ability of electric power. In this case, selection for cutting off a proper electrical load is performed on the basis of the load priority order at step 408.

In the load priority order described in TABLE 1, a small number represents the higher priority order and a large number presents the lower priority order. With reference to the example of FIG. 5A, it is assumed that the generation ability becomes insufficient by turning on the wiper newly as shown in FIG. 5B when the small lamp and the rear window heater are operated. It is understood that the rear window heater has the lowest priority order in accordance with the load priority order map of TABLE 1 and accordingly if the rear window heater is cut off, the generation of electric power can be ensured. In the load priority order, the priority order of the most important load in traveling of vehicles is set to high in consideration of the safety.

In FIG. 4, finally, a cut off instruction of a load to be cut off is produced at step 409. The instruction is transmitted from the light emitting diode 138 through the external terminal (C terminal) and the optical cable to the concentrated wiring system in accordance with the protocol of the communication signal shown in FIG. 8 to cut off the load.

According to the embodiment, when the illumination apparatus is used, the load response control can be prohibited to suppress reduction of the intensity of illumination due to other loads, so that the safety in traveling of vehicles can be improved. Further, since electric power exceeding the generation ability of the generator can be prevented from being supplied, excessive discharge of the battery can be prevented and deficiencies such as failure in starting of a vehicle and stop of an engine can be avoided.

In the embodiment described above, the optical fiber cable is used as transmission means of signals, while electrical signals may be used. Further, it is not necessary that the signal is constituted by the serial signal and even when a parallel signal is used, the same effects are attained.

Figure 9:
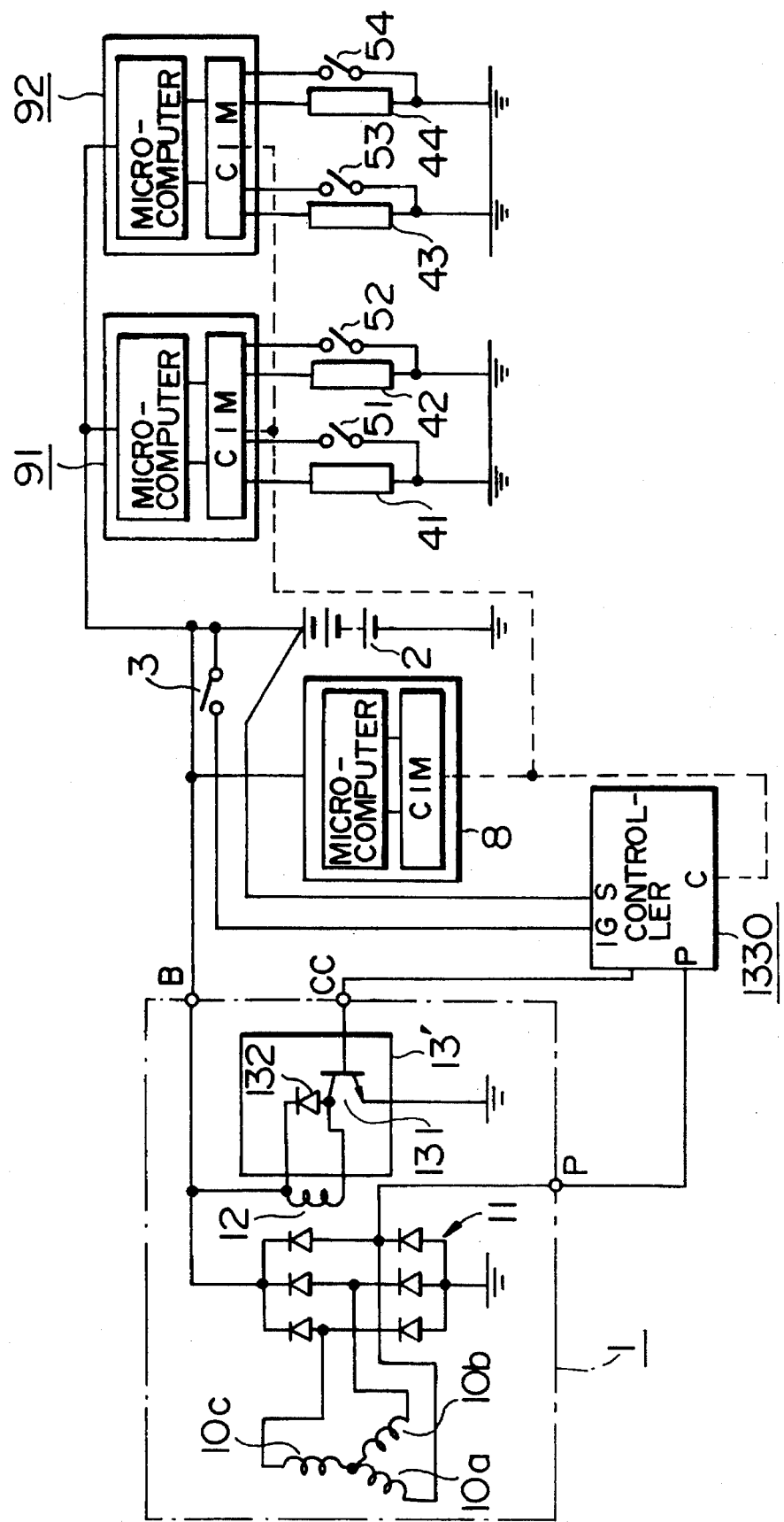
FIG. 9 is a circuit diagram schematically illustrating a charging generator system for an automobile according to another embodiment of the present invention.

FIG. 9 is a circuit diagram illustrating a second embodiment of the present invention. Numeral 13' denotes a power switch which includes a power transistor 131 and a flywheel diode 132. Numeral 1330 denotes a control circuit which is constituted as shown in FIG. 10.

Figure 10:
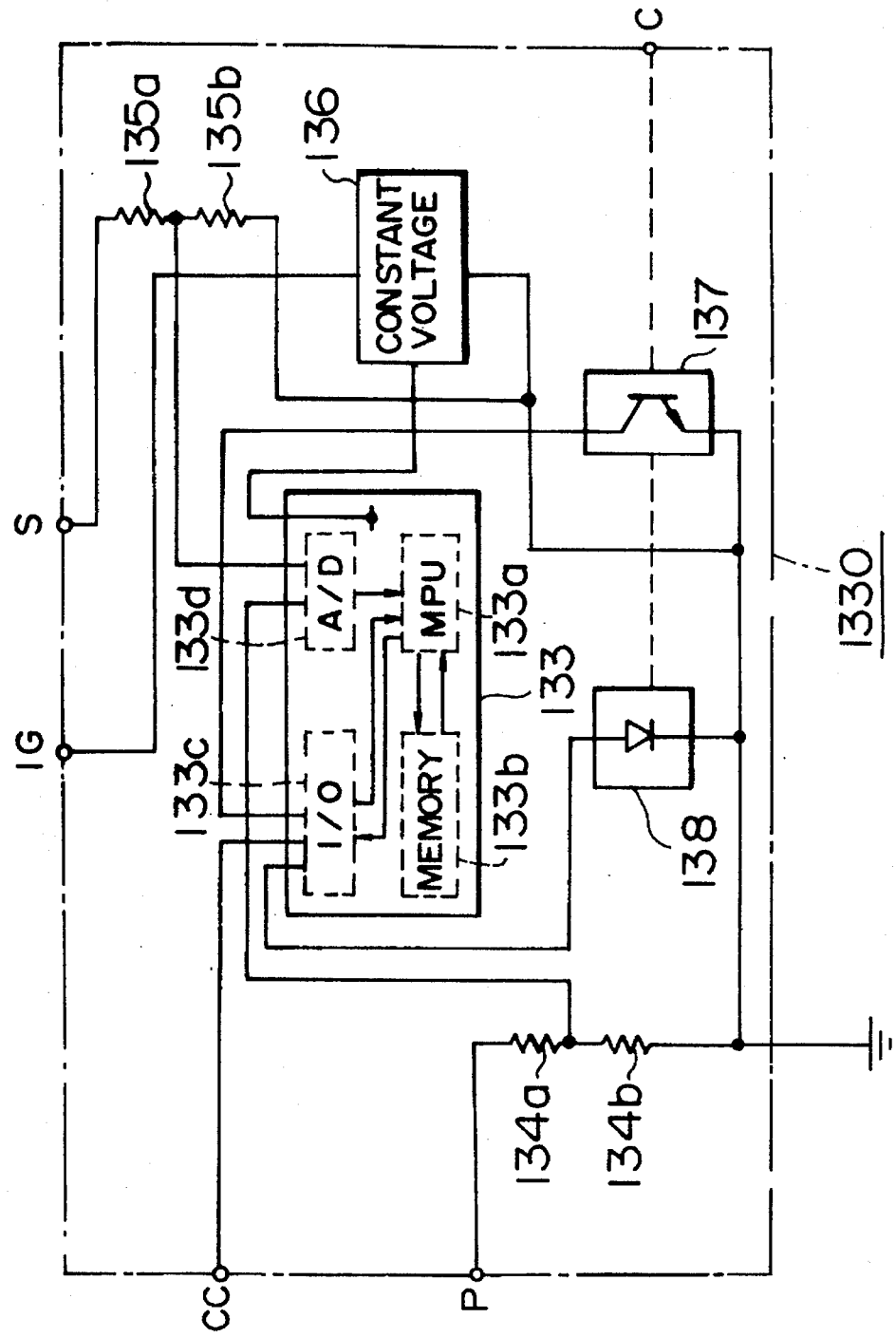
FIG. 10 is an internal circuit diagram schematically illustrating a voltage controller in the system shown in FIG. 9.

FIG. 10 is an internal circuit diagram of the control circuit 1330 shown in FIG. 9. The same elements as those of FIG. 2 are designated by the same numerals. The control circuit 1330 is different from the control circuit 133 in that the circuit 1330 does not include the power transistor 131 and the flywheel diode 132.

Operation of the embodiment with such configuration is the same as the first embodiment, while the microcomputer is not provided within the generator and is disposed outside of the generator. In the embodiment, the number of terminals of the generator is reduced by 1 as compared with the embodiment of FIG. 1, so that a cost of wiring can be reduced. In addition, the control circuit 1330 can be not used to control the generator 1 exclusively and can be shared with the function for controlling, for example, the wiper and the headlight. In this case, a cost of the whole vehicle can be further reduced.

According to the present invention, the pattern of electric power can be produced in accordance with the applied load while identifying the kind of the electrical load. Particularly, when the present invention is used in combination with the internal combustion engine, the driving torque of the electrical load and the internal combustion engine can be coincident with each other and variation in rotation of the internal combustion engine can be suppressed to the minimum. Further, when the load having the higher load response priority order has been applied already, the load response control can be cut off. In addition, by varying the pattern of electric power in accordance with the kind of the electrical load, influence to the electrical system such as a battery can be considered and a program can be set to the previously set contents, so that the reliability of vehicles can be improved.

We claim:

1. A generation controller for a vehicle for use in a concentrated wiring system including a generator, a battery charged by said generator, a plurality of local processing units for supplying electric power from said battery to at least one electrical device, a central control unit for performing data transmission between said central control unit and said local processing units, switches connected to said local processing units, and a voltage regulator for adjusting a voltage generated by said generator, wherein said voltage controller comprising:
memory means for storing an amount of electric power generated by turning on of said switches;
a receiving circuit for receiving data of a turned-on state of said switches transmitted from said central control unit; and a control unit for detecting the turning on of said switches by means of said receiving circuit and increasing an amount of electric power corresponding to the turned-on switches with a predetermined waveform.

2. A generation controller for a vehicle according to claim 1, wherein a pattern for increasing the amount of electric power is varied in accordance with a kind of an electrical load defined for each of said switches.

3. A generation controller for a vehicle according to claim 1, wherein said central processing unit, said local processing units and an external control signal terminal (C terminal) of said receiving circuit included in said generator are connected to each other through an optical fiber cable.

4. A generation controller for a vehicle according to claim 2, wherein said load switch is disposed in a position nearest to said central processing unit or said local processing units.

5. A generation controller for a vehicle for use in a concentrated wiring system including a generator, a battery charged by said generator, a plurality of local processing units for supplying electric power from said battery to at least one electrical load device, a central control unit for performing data transmission between said central control unit and said local processing units, switches connected to said local processing units, and a voltage regulator for adjusting a voltage generated by said generator, said generation controller comprising:

a receiving circuit for receiving data of a turned-on state of said switches transmitted from said central control unit in combination of turned-on switches; and a control circuit for detecting kinds of applied loads in said switches by means of said receiving circuit and increasing an amount of electric power with a predetermined waveform in accordance with a combination of the applied loads.

6. A generation controller for a vehicle for use in a concentrated wiring system including a generator, a battery charged by said generator, a plurality of local processing units for supplying electric power from said battery to at least one electrical load device, a central control unit for performing data transmission between said central control unit and said local processing units, switches connected to said local processing units, and a voltage regulator for adjusting a voltage generated by said generator, said generation controller comprising:

memory means for storing an amount of electric power generated by turning on of said switches;

a receiving circuit for receiving data of a turned-on state of said switches transmitted from said central control unit; and a transmission circuit for detecting turning on of said switches by means of said receiving circuit and calculating a total amount of electric power corresponding to the turned-on switches to compare said total amount with a predetermined allowable value and produce a signal for preventing energization to said electrical load in the applied loads in accordance with a predetermined priority order when said total amount exceeds said allowable value.

7. A generation controller for use in a generation system for a vehicle including a generator, a battery charged by said generator, a plurality of electrical loads, a plurality of operation switches for performing application and cutoff of said plurality of electrical loads, respectively, an electric power supply circuit responsive to a state of said plurality of operation switches to supply electric power to said electrical load having the operation switch turned on, of said plurality of operation switches, and a voltage regulator for adjusting a generated voltage of said generator, said generation controller comprising:

a receiving circuit for receiving data representative of a turned-on state of said plurality of switches;

a memory circuit for storing the turned-on state of said plurality of switches obtained from said received data;

a memory table for storing a pattern of electric power to be supplied after application of said electrical load for each of said plurality of electrical load and a load response priority order assigned previously to each of said plurality of electrical loads; and a control circuit for identifying a newly applied electrical load on the basis of the turned-on state of said plurality of switches stored in said memory circuit and instructing said electric power supply circuit to supply electric power in accordance with the supply power pattern corresponding to said identified load;

said control circuit prohibiting application of said newly applied electrical load when said control circuit judges from contents of said memory circuit that said electrical load having the load response priority order higher than that of said newly applied electrical load has been already applied.

8. A generation controller for use in a generation system for a vehicle including a generator, a battery charged by said generator, a plurality of electrical loads, a plurality of operation switches for performing application and cutoff of said plurality of electrical loads, respectively, an electric power supply circuit responsive to a state of said plurality of operation switches to supply electric power to said electrical load having the operation switch turned on, of said plurality of operation switches, and a voltage regulator for adjusting a generated voltage of said generator, said generation controller comprising:

a receiving circuit for receiving data representative of a turned-on state of said plurality of switches;

a memory circuit for storing the turned-on state of said plurality of switches obtained from said received data;

a memory table for storing consumption power and an application priority order assigned previously to each of said plurality of electrical loads;

means for calculating a total amount of consumption power of the applied electrical loads on the basis of the turned-on state of said plurality of switches stored in said memory circuit; and a control circuit for identifying a newly applied electrical load on the basis of the turned-on state of said plurality of switches stored in said memory circuit and instructing said electric power supply circuit to supply electric power to said identified load;

said control circuit instructing to cut off said electrical load having a lower application priority order when the total amount of consumption power exceeds a predetermined value and said control circuit judges from contents of said memory circuit that said electrical load having said application priority order lower than that of said newly applied electrical load has been already applied.

9. A generation controller for use in a generation system for a vehicle including a generator, a battery charged by said generator, a plurality of electrical loads, a plurality of operation switches for performing application and cutoff of said plurality of electrical loads, respectively, an electric power supply circuit responsive to a state of said plurality of operation switches to supply electric power to said electrical load having the operation switch turned on, of said plurality of operation switches, and a voltage regulator for adjusting a generated voltage of said generator, said generation controller comprising:

a receiving circuit for receiving data representative of a turned-on state of said plurality of switches;

a memory circuit for storing the turned-on state of said plurality of switches obtained from said received data;

a memory table for storing a pattern of electric power to be supplied after application of said electrical load for each of said plurality of electrical load, a load response priority order assigned previously to each of said plurality of electrical loads, consumption power and an application priority order assigned previously to each of said electrical load;

means for calculating a total amount of consumption power of applied electrical loads on the basis of the turned-on state of said plurality of switches stored in said memory circuit; and a control circuit for identifying a newly applied electrical load on the basis of the turned-on state of said plurality of switches stored in said memory circuit and instructing said electric power supply circuit to supply electric power in accordance with the supply power pattern corresponding to said identified load;

said control circuit prohibiting application of said newly applied electrical load when said control circuit judges from contents of said memory circuit that said electrical load having the load response priority order higher than that of said newly applied electrical load has been already applied and instructing cutoff of said electrical load having a lower application priority order when said control circuit judges that the total amount of consumption power exceeds a predetermined value and judges from contents of said memory circuit that said electrical load having the application priority order lower than that of said newly applied electrical load has been already applied.

10. A generation controller according to claim 7, wherein said generation controller is disposed within said voltage regulator.

11. A generation controller according to claim 8, wherein said generation controller is disposed within said voltage regulator.

12. A generation controller according to claim 9, wherein said generation controller is disposed within said voltage regulator.

13. A generation controller according to claim 7, wherein said generation controller is disposed outside of said voltage regulator.

14. A generation controller according to claim 8, wherein said generation controller is disposed outside of said voltage regulator.

15. A generation controller according to claim 9, wherein said generation controller is disposed outside of said voltage regulator.

16. A generation controller according to claim 7, wherein said data representative of the turned-on state of said plurality of switches is transmitted to said receiving circuit by a serial data transmission technique.

17. A generation controller according to claim 8, wherein said data representative of the turned-on state of said plurality of switches is transmitted to said receiving circuit by a serial data transmission technique.

18. A generation controller according to claim 9, wherein said data representative of the turned-on state of said plurality of switches is transmitted to said receiving circuit by a serial data transmission technique.

19. A generation controller according to claim 16, wherein said data representative of the turned-on state of said plurality of switches is transmitted to said receiving circuit through an optical fiber.

20. A generation controller according to claim 17, wherein said data representative of the turned-on state of said plurality of switches is transmitted to said receiving circuit through an optical fiber.

21. A generation controller according to claim 18, wherein said data representative of the turned-on state of said plurality of switches is transmitted to said receiving circuit through an optical fiber.

22. A generation system for a vehicle comprising:

a generator;

a battery charged by said generator;

a plurality of electrical loads;

a plurality of operation switches for performing application and cutoff of said plurality of electrical loads, respectively;

an electric power supply circuit responsive to a state of said plurality of operation switches to supply electric power to said electrical load having the operation switch turned-on, of said plurality of operation switches;

a voltage regulator for adjusting a generated electric power of said generator; and a generation controller including:
  a receiving circuit for receiving data representative of a turned-on state of said plurality of switches;
  a memory circuit for storing the turned-on state of said plurality of switches obtained from said received data;
  a memory table for storing a pattern of electric power to be supplied after application of said electrical load for each of said plurality of electrical load and a load response priority order assigned previously to each of said plurality of electrical loads; and
  a control circuit for identifying a newly applied electrical load on the basis of the turned-on state of said plurality of switches stored in said memory circuit and instructing said electric power supply circuit to supply electric power in accordance with the supply power pattern corresponding to said identified load;
  said control circuit prohibiting application of said newly applied electrical load when said control circuit judges from contents of said memory circuit that said electrical load having the load response priority order higher than that of said newly applied electrical load has been already applied.

23. A generation system for a vehicle comprising:

a generator;

a battery charged by said generator;

a plurality of electrical loads;

a plurality of operation switches for performing application and cutoff of said plurality of electrical loads, respectively;

an electric power supply circuit responsive to a state of said plurality of operation switches to supply electric power to said electrical load having the operation switch turned-on, of said plurality of operation switches;

a voltage regulator for adjusting a generated electric power of said generator; and a generation controller including:

a receiving circuit for receiving data representative of a turned-on state of said plurality of switches;

a memory circuit for storing the turned-on state of said plurality of switches obtained from said received data;

a memory table for storing consumption power and an application priority order assigned previously to each of said plurality of electrical loads;

means for calculating a total amount of consumption power of the applied electrical loads on the basis of the turned-on state of said plurality of switches stored in said memory circuit; and a control circuit for identifying a newly applied electrical load on the basis of the turned-on state of said plurality of switches stored in said memory circuit and instructing said electric power supply circuit to supply electric power to said identified load;

said control circuit instructing to cut off said electrical load having a lower application priority order when the total amount of consumption power exceeds a predetermined value and said control circuit judges from contents of said memory circuit that said electrical load having said application priority order lower than that of said newly applied electrical load has been already applied.

* * * * *